( 12 ) United States Patent
Siann

(10) Patent No.: US 10,251,124 B2
(45) Date of Patent: Apr. 2, 2019

(54) EXTENDING SLEEP MODE IN WIRELESS DEVICE

(71) Applicant: BRETELON, INC., San Diego, CA (US)

(72) Inventor: Jonathan Siann, San Diego, CA (US)

(73) Assignee: BRETELON, INC., San Diego, CA (US)

( * ) Notice: Subject to any disclaimer, the term of this patent is extended or adjusted under 35 U.S.C. 154(b) by 0 days.

(21) Appl. No.: 15/321,043

(22) PCT Filed: Jun. 25, 2015

(86) PCT No.: PCT/US2015/037731
§ 371 (c)(1),
(2) Date: Dec. 21, 2016

(87) PCT Pub. No.: WO2015/200658
PCT Pub. Date: Dec. 30, 2015

(65) Prior Publication Data
US 2017/0208545 A1 Jul. 20, 2017

Related U.S. Application Data

(60) Provisional application No. 62/017,752, filed on Jun. 26, 2014.

(51) Int. Cl.
H04W 52/02 (2009.01)
H04W 68/02 (2009.01)
(Continued)

(52) U.S. Cl.
CPC ... *H04W 52/0216* (2013.01); *H04W 52/0229* (2013.01); *H04W 68/02* (2013.01);
(Continued)

(58) Field of Classification Search
CPC ............. H04W 52/02; H04W 52/0216; H04W 52/0229; H04W 68/02; H04W 76/28;
(Continued)

(56) References Cited

U.S. PATENT DOCUMENTS 6,665,307 B1 * 12/2003 Rydnell ................ H04W 72/12
370/437
8,284,706 B2 * 10/2012 Ulupinar ........... H04W 52/0216
370/311
(Continued)

FOREIGN PATENT DOCUMENTS

KR 2000/0046201 * 7/2000 ............... H04B 1/40
WO 2013149666 A1 10/2013

OTHER PUBLICATIONS

International Searching Authority, Korean Intellectual Property Office, International Search Report and Written Opinion, received in PCT/US2015/037731, dated Nov. 12, 2015, 14 pages.
(Continued)

*Primary Examiner* — Tri H Phan
(74) *Attorney, Agent, or Firm* — Procopio, Cory, Hargreaves & Savitch LLP

(57) ABSTRACT

A method for extending sleep mode in a first tag may include: determining a next transmission time to transmit data to the first tag via a communication network based on a reception schedule associated with the first tag and a paging schedule associated with the communication network, wherein the first tag is configured to transition between sleep mode and active mode based on the reception schedule associated with the first tag and the paging schedule associated with the communication network; receiving data destined for the first tag; and in response to determining that a current time does not correspond to the next transmission time to transmit data to the first tag, extending sleep
(Continued)

mode in the first tag by storing the data destined for the first tag in a first queue associated with the first tag.

10 Claims, 7 Drawing Sheets

(51) Int. Cl.
*H04W 76/28* (2018.01)
*H04W 68/00* (2009.01)

(52) U.S. Cl.
CPC .......... *H04W 68/005* (2013.01); *H04W 76/28* (2018.02); *Y02D 70/00* (2018.01); *Y02D 70/1242* (2018.01); *Y02D 70/1262* (2018.01); *Y02D 70/24* (2018.01)

(58) Field of Classification Search
CPC .. H04W 76/048; H04W 68/005; Y02D 70/00; Y02D 70/24; Y02D 70/1242; Y02D 70/1262
See application file for complete search history.

(56) References Cited

U.S. PATENT DOCUMENTS

| | | | |
|---|---|---|---|
| 8,385,878 B2* | 2/2013 | Rao | H04W 52/028 455/343.2 |
| 9,521,650 B2* | 12/2016 | Rune | H04W 52/0216 |
| 9,953,193 B2* | 4/2018 | Butler | G06K 7/0008 |
| 9,961,697 B2* | 5/2018 | Hevizi | H04W 72/1252 |
| 2002/0006805 A1 | 1/2002 | New et al. | |
| 2008/0309490 A1 | 12/2008 | Honkanen et al. | |
| 2010/0246591 A1 | 9/2010 | Gobriel et al. | |
| 2011/0256891 A1 | 10/2011 | Soliman et al. | |
| 2011/0316676 A1* | 12/2011 | Bajic | G06K 7/0008 340/10.33 |
| 2014/0133475 A1 | 5/2014 | Hong et al. | |
| 2015/0305084 A1* | 10/2015 | Ji | H04W 76/048 370/311 |

OTHER PUBLICATIONS

Extended European Search Report dated Jan. 18, 2018 for related European Patent Application No. 15811968.5, in 12 pages.

* cited by examiner

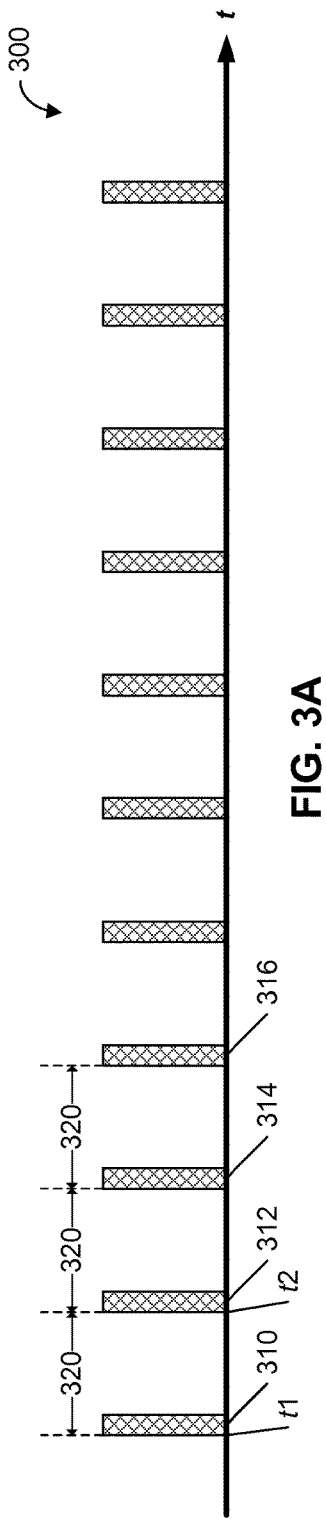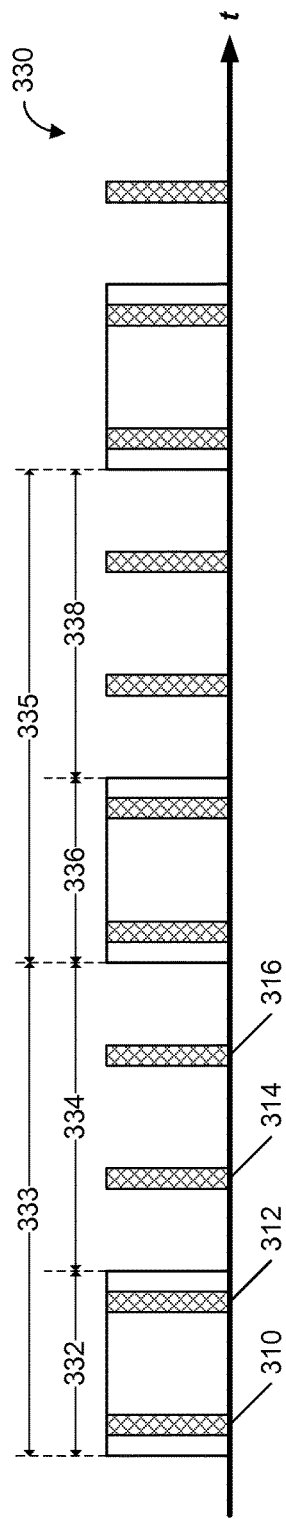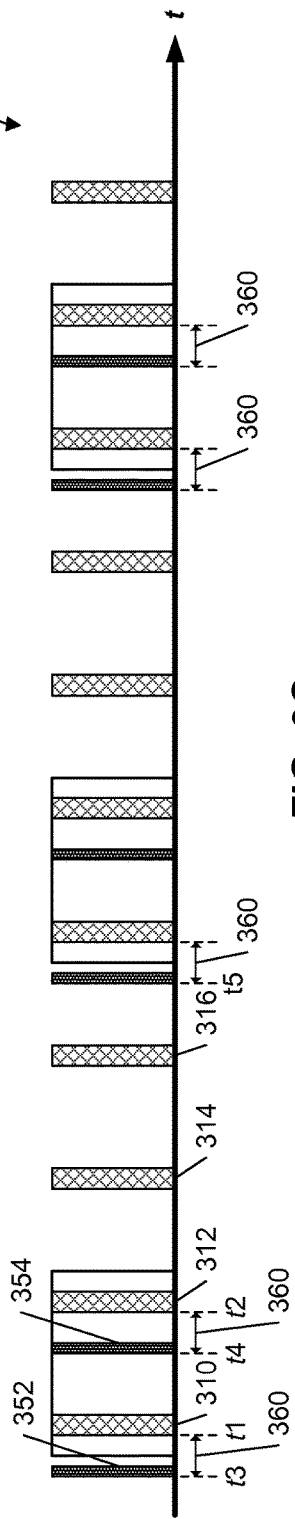

EXTENDING SLEEP MODE IN WIRELESS DEVICE

BACKGROUND

Certain aspects of the present disclosure generally relate to wireless communications and, more particularly, to techniques for paging during discontinuous reception (DRx) and paging operations.

To alert a wireless device to incoming data (e.g., a short messaging service (SMS) message), a communication network may broadcast paging messages during periodic paging occasions. Accordingly, a conventional wireless device may wake up at each paging occasion in order to monitor for paging messages from the communication network. For example, in a Long-Term Evolution (LTE) communication network, one paging occasion may be scheduled every 1.28 seconds. As such, a conventional wireless device operating in an LTE communication network may wake up and monitor a physical downlink control channel (PDCCH) for paging messages every 1.28 seconds.

Notably, the length of paging cycles (i.e., time elapsed between consecutive paging occasions) implemented by a communication network may have significant impact on the power profile of a conventional wireless device. When the length of the paging cycles is relatively short, a conventional wireless device may wake up and monitor for paging messages from the communication network more frequently. Consequently, even though a conventional wireless device may be more responsive (i.e., quicker to detect incoming data) as a result of shorter paging cycles, it may also consume significantly more power and drain its power supply at a much faster rate.

Many wireless applications (e.g., pet tracking) may limit the physical dimensions of the corresponding wireless devices (e.g., wireless pet collar). A compact wireless device may be unable to accommodate a large power pack and thus cannot sustain conventional length paging cycles (e.g., 1.28 seconds in a LTE communication network) over a reasonable operation period (e.g., 2 or 3 years).

Moreover, the requirements for responsiveness and power consumption may vary for different wireless applications and/or wireless devices, as well as for different operation conditions. For example, some wireless applications (e.g., wireless parking meters) deployed in certain locations (e.g., downtown) and during certain time periods (e.g., weekends) may be more tolerant to response delays concomitant with longer paging cycles. Meanwhile, wireless devices used in some applications (e.g., wireless parking meter) may have more capacity to hold a larger power pack and can therefore afford shorter paging cycles. Thus, the single length paging cycle implemented by a communication network may not be suitable across different wireless applications and/or wireless devices.

Therefore, what is needed is a system, apparatus, and method that overcomes these significant problems found in the aforementioned conventional systems.

SUMMARY

Systems, apparatuses, and methods for extending sleep mode are provided.

According to various embodiments, there is provided a method for extending sleep mode. The method may include: determining a next transmission time to transmit data to a first tag via a communication network based on a reception schedule associated with the first tag and a paging schedule associated with the communication network, wherein the first tag is configured to transition between sleep mode and active mode based on the reception schedule associated with the first tag and the paging schedule associated with the communication network; receiving data destined for the first tag; and in response to determining that a current time does not correspond to the next transmission time to transmit data to the first tag, extending sleep mode in the first tag by storing the data destined for the first tag in a first queue associated with the first tag.

According to various embodiments, there is provided a tag. In some embodiments, the tag may include a radio frequency (RF) chain and a control unit.

The control unit may be configured to: transition the tag to active mode based on a reception schedule associated with the tag and a paging schedule associated with a communication network; and utilize the RF chain to monitor a paging channel while the tag is in the active mode.

According to various embodiments, there is provided a system for extending sleep mode. The system may include a data queue module configured to manage a first queue associated with the first tag. The system may further include a data synchronization and delivery module configured to: determine a next transmission time to transmit data to the first tag via a communication network based on a reception schedule associated with the first tag and a paging schedule associated with the communication network, wherein the first tag is configured to transition between sleep mode and active mode based on the reception schedule associated with the first tag and the paging schedule associated with the communication network; receive data destined for the first tag; and in response to determining that a current time does not correspond to the next transmission time to transmit data to the first tag, extend sleep mode in the first tag by storing the data destined for the first tag in the first queue associated with the first tag.

According to various embodiments, there is provided a system for extending sleep mode. The exchange platform may include: means for managing a first queue associated with a first tag; means for determining a next transmission time to transmit data to the first tag via a communication network based on a reception schedule associated with the first tag and a paging schedule associated with the communication network, wherein the first tag is configured to transition between a sleep mode and an active mode based on the reception schedule associated with the first tag and the paging schedule associated with the communication network; means for receiving data destined for the first tag; and in response to determining that a current time does not correspond to the next transmission time to transmit data to the first tag, means for extending sleep mode in the first tag by storing the data destined for the first tag in the first queue associated with the first tag.

According to various embodiments, there is provided a tag. The tag may include: means for transitioning the tag to active mode based on a reception schedule associated with the tag and a paging schedule associated with a communication network; and means for utilizing an RF chain to monitor a paging channel while the tag is in the active mode.

According to various embodiments, there is provided a system for extending sleep mode. The system may include a first tag and an exchange platform. The first tag may include an RF chain and a control unit configured to: transition the first tag between sleep mode and active mode based on a reception schedule associated with the tag and a paging schedule associated with a communication network;

and utilize the RF chain to monitor a paging channel while the first tag is in the active mode.

The exchange platform may include a data queue module configured to manage a first queue associated with the first tag and a data synchronization and delivery module configured to: determine a next transmission time to transmit data to the first tag via the communication network based on the reception schedule associated with the first tag and the paging schedule associated with the communication network; receive data destined for the first tag; and in response to determining that a current time does not correspond to the next transmission time to transmit data to the first tag, extend sleep mode in the first tag by storing the data destined for the first tag in the first queue associated with the first tag.

Other features and advantages of the present inventive concept should be apparent from the following description that illustrates by way of example aspects of the present inventive concept.

BRIEF DESCRIPTION OF THE DRAWINGS

The structure and operation of the present inventive concept will be understood from a review of the following detailed description and the accompanying drawings in which like reference numerals refer to like parts and in which:

FIG. 3A illustrates a paging schedule according to various embodiments;

FIG. 3B illustrates a reception schedule according to various embodiments;

FIG. 3C illustrates a transmission schedule according to various embodiments;

DETAILED DESCRIPTION

Certain embodiments disclosed herein provide for methods, systems and apparatus for extending sleep mode. After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Figure 1:
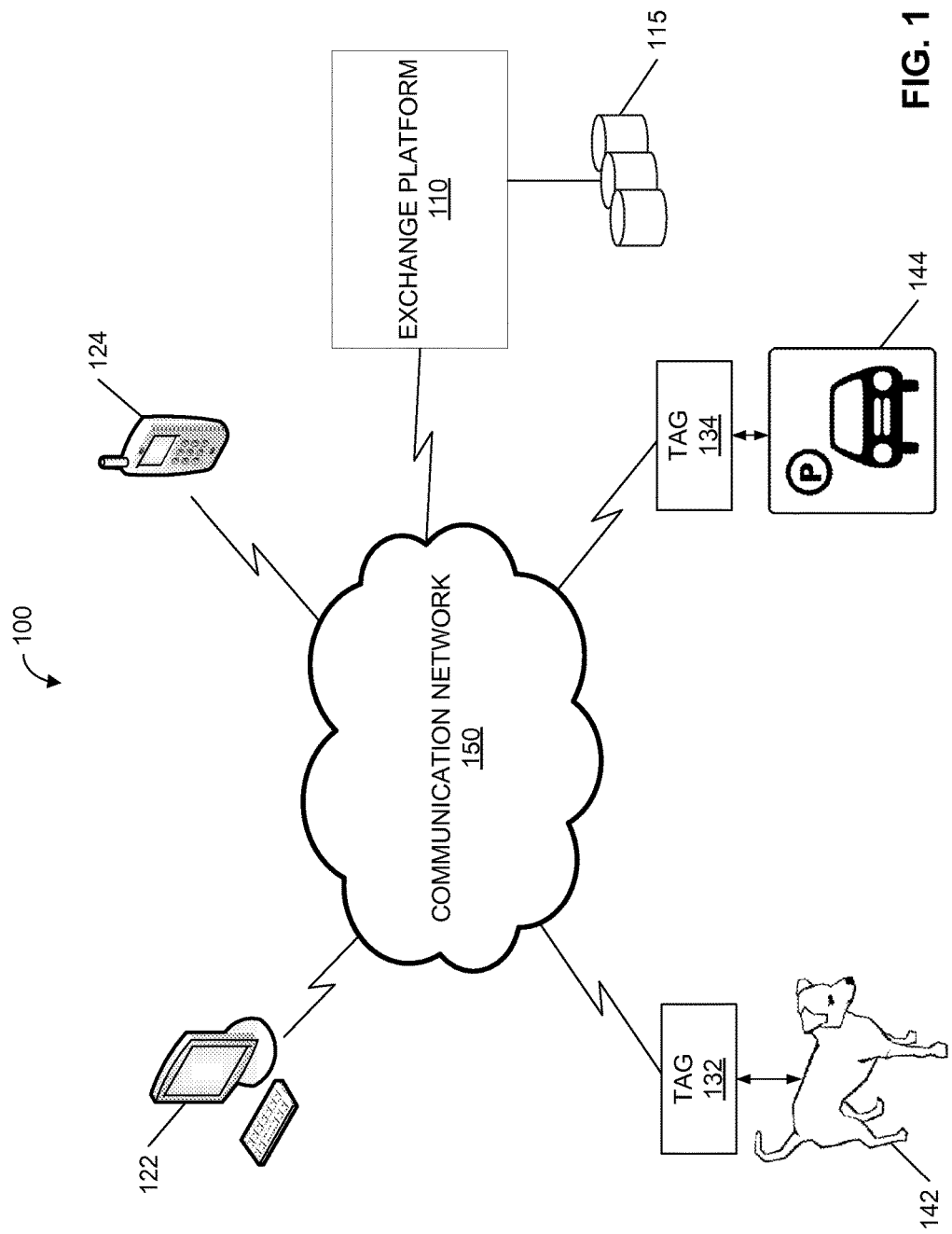
FIG. 1 is a network diagram illustrating a network environment according to various embodiments.

FIG. 1 is a network diagram illustrating a network environment 100 according to various embodiments. Referring to FIG. 1, a first device 122 and a second device 124 may communicate with an exchange platform 110 that may be communicatively coupled to a database 115. The first device 122 and the second device 124 may each be a wired or a wireless communication device including, for example, but not limited to, a smartphone, a tablet personal computer (PC), a laptop, and a desktop PC.

In various embodiments, an application (not shown) installed on the first device 122 may cause the first device 122 to transmit data to the exchange platform 110. The application installed on the first device 122 may be associated with a first asset 142. According to one exemplary embodiment, the application installed on the first device 122 may transmit to the exchange platform 110 data (e.g., SMS messages) that may be used to manage the first asset 142 via a first tag 132. For example, a pet tracking application may be installed on the first device 122, while the first asset 142 may be a pet that is monitored using the first tag 132, which may be a wireless pet collar. A person having ordinary skill in the art can appreciate that the first tag 132 may be tag or a transceiver without departing from the scope of the present inventive concept.

Similarly, in various embodiments, an application (not shown) installed on the second device 124 may cause the second device 124 to transmit data to the exchange platform 110. The application installed on the second device 124 may be associated with a second asset 144. According to one exemplary embodiment, the application installed on the second device 124 may transmit to the exchange platform 110 data (e.g., SMS messages) that may be used to manage the second asset 144 via a second tag 134. For example, the second asset 144 may be a parking space and a parking application installed on the second device 124 may be used to manage the parking space (e.g., remotely replenish a parking meter) via the second tag 134, which may be a wireless parking meter. A person having ordinary skill in the art can appreciate that the first tag 132 may be tag or a transceiver without departing from the scope of the present inventive concept.

In various embodiments, the first device 122 and the second device 124 may communicate with the exchange platform 110 via a wired and/or a wireless connection. For example, the first device and the second device 124 may communicate with the exchange platform 110 via a communication network 150 or a different communication network. In various embodiments, the communication network 150 may be, for example, but not limited to, a wireless or a mobile communication network, or any combination of networks including public and private networks.

Although the first device 122 is shown to manage the first asset 142 via the first tag 132 and the second device 124 is shown to manage the second asset 144 via the second tag 134, a person having ordinary skill in the art can appreciate that a different number of devices can manage a different number of assets without departing from the scope of the present inventive concept. Moreover, the first device 122 and the second device 124 may each manage more than one asset, and each of the first asset 142 and the second asset 144 may be managed by more than one device without departing from the scope of the present inventive concept. The first tag 132 and the second tag 134 may also each manage more than one asset without departing from the scope of the present inventive concept.

According to one exemplary embodiment, the first tag 132 and the second tag 134 may each be any device capable of wirelessly communicating with one or more communication networks (e.g., the communication network 150). In various embodiments, the first tag 132 and the second tag 134 may be an appendage (e.g., external) to the first asset 142 and the second asset 144 (e.g., a pet collar on a pet). Alternately, in some embodiments, the first tag 132 and the second tag 134 may be an integrated component of the first asset 142 and the second asset 144 (e.g., a wireless module in a parking meter). However, a person having ordinary skill in the art can appreciate that the first tag 132 may be attached to or incorporated in the first asset 142 in any manner without departing from the scope of the present inventive concept. Likewise, the second tag 134 may be attached to or incorporated in the second asset 144 in any manner without departing from the scope of the present inventive concept.

In various embodiments, the exchange platform 110 may receive data destined for the first tag 132 from the first device 122. According to one exemplary embodiment, the exchange platform 110 may be configured to extend sleep mode in the first tag 132. As such, in various embodiments, the exchange platform 110 may determine a next transmission time for the data destined for the first tag 132. In one exemplary embodiment, the exchange platform 110 may determine the next transmission time based on a reception schedule of the first tag 132 and a paging schedule of the communication network 150. When a current time is not the same as the next transmission time, the exchange platform 110 may queue any data destined for the first tag 132 received from the first device 122. Alternately, if the exchange platform 110 determines the current time is the same as the next transmission time, the exchange platform 110 may transmit to the first tag 132 via the communication network 150 at least a portion of data queued for the first tag 132. The communication network 150 may alert the first tag 132 to the incoming data via one or more paging messages and transmit the queued data received from the exchange platform 110 to the first tag 132.

In various embodiments, the exchange platform 110 may also receive data destined for the second tag 134 from the second device 124 and extend sleep mode in the second tag 134. According to one exemplary embodiment, the exchange platform 110 may determine a next transmission time for the data destined for the second tag 134 based on a reception schedule of the second tag 134 and the paging schedule of the communication network 150. The exchange platform 110 may queue received from the second device 124 if the exchange platform 110 determines that the current time is not the same as the next transmission time. Alternately, in response to determining that the current time is the same as the next transmission time, the exchange platform 110 may transmit to the second tag 134 via the communication network 150 at least a portion of the queued data for the second tag 134. The communication network 150 may alert the second tag 134 to the incoming data via one or more paging messages and transmit the queued data received from the exchange platform 110 to the second tag 134.

According to one exemplary embodiment, the first tag 132 and the second tag 134 may each be associated with a different reception schedule. The reception schedule associated with each of the first tag 132 and the second tag 134 may also be varied periodically and/or dynamically through the course of operation. In various embodiments, the reception schedule for each of the first tag 132 and the second tag 134 may be determined and/or varied based on factors including, for example, but not limited to, the responsiveness, power profile, and operations conditions associated with the corresponding application. For example, the pet tracking application may be more tolerant to delays during certain parts of the day (e.g., between 8 PM and 8 AM when a pet owner is home) and the wireless pet collar may operate on different reception schedules during different times of the day.

In various embodiments, in response to receiving incoming data for the first tag 132 and/or the second tag 134, the communication network 150 may be configured to broadcast paging messages on a paging channel according to the paging schedule of the communication network 150. The communication network 150 may be further configured to transmit the data received from the exchange platform 110 to the first tag 132 and/or the second tag 134. For example, the communication network 150 may be an LTE communication network and may broadcast paging messages on the PDCCH during paging occasions scheduled for every 1.28 seconds. However, a person having ordinary skill in the art can appreciate that the communication network 150 may support any radio access technology (RAT) including, for example, but not limited to LTE, Wideband Code Division Multiple Access (WCDMA), Global System for Mobile communications (GSM), and Time Division-Synchronous Code Division Multiple Access (TD-SCDMA) without departing from the scope of the present inventive concept.

Figure 2:
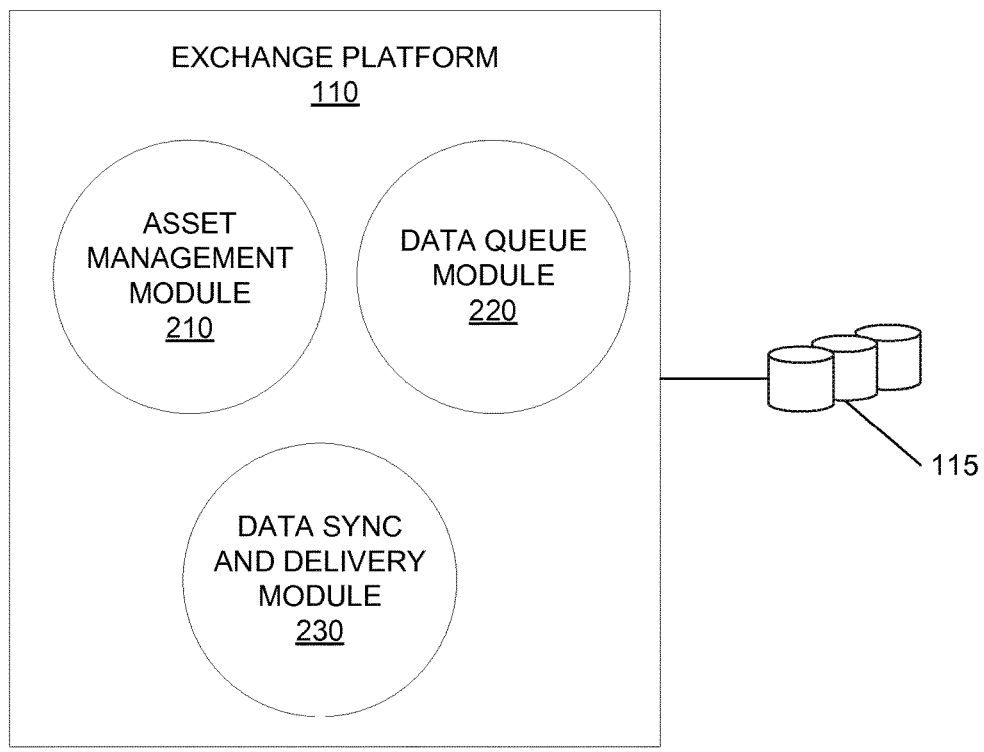
FIG. 2 is a block diagram illustrating an exchange platform according to various embodiments.

FIG. 2 is a block diagram illustrating the exchange platform 110 according to various embodiments. Referring to FIGS. 1-2, the exchange platform 110 may include an asset management module 210, a data queue module 220, and a data synchronization and delivery module 230. The exchange platform 110 may be communicatively coupled with the database 115.

In various embodiments, the asset management module 210 may be configured to store (e.g., in the database 115) and manage one or more subscriber identifiers including, for example, but not limited to, at least one subscriber identifier associated with the first tag 132 and at least one subscriber identifier associated with the second tag 134. In various embodiments, the stored subscriber identifiers may be, for example, but not limited to, an international mobile subscriber identity (IMSI) associated with each of the first tag 132 and the second tag 134.

According to one exemplary embodiment, the exchange platform 110 may receive from the first device 122 data destined for the first tag 132 (or a different tag). The exchange platform 110 may transmit at least a portion of data queued for the first tag 132 at various transmission times. In various embodiments, the asset management module 210 may be configured to determine a subscriber identifier associated with the first tag 132. At a transmission time, the exchange platform 110 may transmit the data and the corresponding subscriber identifier (e.g., IMSI) of the first tag 132 to the communication network 150. As such, in various embodiments, the communication network 150 may page and transmit the data to the first tag 132 based on the subscriber identifier (e.g., IMSI) associated with the first tag 132.

In various embodiments, the data queue module 220 may be configured to manage one or more data queues. For example, in some embodiments, the first tag 132 and the second tag 134 may each be associated with a data queue. As such, in some embodiments, the data queue module 220 may store data destined for the first tag 132 in one queue and data destined for the second tag 134 in a separate queue. Alternately, in some embodiments, at least some tags may share the same queue. Accordingly, the data queue module 220 may store data destined for the first tag 132 and data destined for the second tag 134 in the same queue.

In various embodiments, the data synchronization and delivery module 230 may be configured to determine transmission times to transmit data to each of the first tag 132 and the second tag 134. According to one exemplary embodiment, the data synchronization and delivery module 230 may queue data destined for the first tag 132 and/or the second tag 134 when the current time is not the same as a transmission time. Alternately, the data synchronization and delivery module 230 may transmit queued data to the first tag 132 and/or the second tag 134 when the current time is the same as a transmission time.

In one exemplary embodiment, the data synchronization and delivery module 230 may determine the transmission times to transmit data to the first tag 132 based on the reception schedule of the first tag 132 and the paging schedule of the communication network 150. The data synchronization and delivery module 230 may also determine the transmission times to transmit data to the second tag 134 based on the reception schedule of the second tag 134 and the paging schedule of the communication network 150. In various embodiments, the first tag 132 may have a different reception schedule than the second tag 134. As such, the data synchronization and delivery module 230 may queue and transmit data at different times for the first tag 132 than for the second tag 134.

FIG. 3A illustrates a paging schedule 300 according to various embodiments. Referring to FIG. 3A, the communication network 150 may broadcast paging messages according to the paging schedule 300. The paging schedule 300 may include a plurality of paging occasions including, for example, but not limited to, a first paging occasion 310, a second paging occasion 312, a third paging occasion 314, and a fourth paging occasion 316. In various embodiments, during each of the plurality of paging occasions, the communication network 150 may broadcast one or more paging messages alerting one or more tags to incoming data (e.g., from one or more devices). For example, during at least one of the first paging occasion 310, the second paging occasion 312, the third paging occasion 314, and the fourth paging occasion 316, the communication network 150 may broadcast a paging message alerting the first tag 132 and/or the second tag 134 to incoming data (e.g., from the first device 122 and/or the second device 124).

In various embodiments, a length of the paging cycle 320 implemented by the communication network 150 may be the time elapsed between the start of two consecutive paging occasions. For example, the first paging occasion 310 may be scheduled at a first time t1 and the second paging occasion 312 may be scheduled at a second time t2. As such, the length of the paging cycle 320 implemented by the communication network 150 may be a difference between t1 and t2. In various embodiments, the same length paging cycle (e.g., the paging cycle 320) may be repeated, for example, between the second paging occasion 312 and the third paging occasion 314, and between the third paging occasion 314 and the fourth paging occasion 316.

FIG. 3B illustrates a reception schedule 330 according to various embodiments. Referring to FIGS. 3A and 3B, the first tag 132 may be configured to monitor for paging messages based on the reception schedule 330.

In various embodiments, the reception schedule 330 may include a plurality of active periods including, for example, but not limited to, a first active period 332 and a second active period 336 during which the first tag 132 may be in active mode. The reception schedule 330 may further include a plurality of sleep periods including, for example, but not limited to, a first sleep period 334 and a second sleep period 338 during which the first tag 132 may be in sleep mode.

In various embodiments, the reception schedule 330 of the first tag 132 may include a plurality of periodical cycles, including, for example, but not limited to, a first periodical cycle 333 and a second periodical cycle 335. Each periodical cycle may include an active period and a sleep period. For example, the first periodical cycle 333 may include the first active period 332 and the first sleep period 334. The second periodical cycle 335 may include the second active period 336 and the second sleep period 338.

According to one exemplary embodiment, the first tag 132 may be configured to monitor for paging messages during the active periods. For example, the first paging occasion 310 and the second paging occasion 312 may occur during the first active period 332. As such, the first tag 132 may be configured to tune to the paging channel (e.g., PDCCH) during the first paging occasion 310 and the second paging occasion 312 occurring during the first active period 332.

According to one exemplary embodiment, the first tag 132 may be configured to disregard paging messages during sleep periods. For example, the third paging occasion 314 and the fourth paging occasion 316 may occur during the first sleep period 334. As such, the first tag 132 may be configured to not tune to a paging channel (e.g., PDCCH) during the third paging occasion 314 and the fourth paging occasion 316 occurring during the first sleep period 334.

In various embodiments, each of the plurality of active periods in the reception schedule 330 may include one or more paging occasions. For example, each of the first active period 332 and the second active period 336 in the reception schedule 330 may include two (or a different number) paging occasions. In various embodiments, each of the plurality of sleep periods in the reception schedule 330 may include one or more paging occasions. For example, each of the first sleep period 334 and the second sleep period 338 in the reception schedule 330 may include two (or a different number) paging occasions. In various embodiments, a responsiveness of the first tag 132 may be determined the number of paging occasions included in an active period and the number of paging occasions included in a sleep period. According to one exemplary embodiment, the responsiveness of the first tag 132 may be adjusted by varying one or both of the number of paging occasions included in an active period and the number of paging occasions included in a sleep period. For example, the first tag 132 may be made more responsive by increasing the number of paging occasions included in an active period and/or decreasing the number of paging occasions included in a sleep period.

FIG. 3C illustrates a transmission schedule 340 according to various embodiments. In various embodiments, the exchange platform 110 may be configured to queue data received from the first device 122 and destined for the first tag 132. Referring to FIG. 3A-3C, in various embodiments, the exchange platform 110 may transmit queued data destined for the first tag 132 to the communication network 150 based on the transmission schedule 340. The communication network 150 may subsequently broadcast one or more paging messages (e.g., on a paging channel) alerting the first tag 132 to incoming data and transmit the queued data to the first tag 132.

In various embodiments, the transmission schedule 340 may include a plurality of transmission occasions including, for example, but not limited to, a first transmission occasion 352 and a second transmission occasion 354. During the first transmission occasion 352 and/or the second transmission occasion 354, the exchange platform 110 may transmit at least a portion of the queued data destined for the first tag 132 to the communication network 150.

According to one exemplary embodiment, the transmission schedule 340 of the exchange platform 110 may correspond to the reception schedule 330 of the first tag 132. In various embodiments, transmission occasions in the transmission schedule 340 of the exchange platform 110 may correspond to active periods in the reception schedule 330 of the first tag 132. For example, the first transmission occasion 352 and the second transmission occasion 354 may correspond to the first active period 332. In one exemplary embodiment, the exchange platform 110 may transmit queued data to the first tag 132 via the communication network 150 (e.g., at the first transmission occasion 352 and/or the second transmission occasion 354) while the first tag 132 is in active mode (e.g., during the first active period 332) and is monitoring for paging messages from the communication network 150 alerting the first tag 132 to incoming data.

According to one exemplary embodiment, the exchange platform 110 may determine a transmission time for at least some of the transmission occasions. In various embodiments, the exchange platform 110 may determine each transmission time such that queued data transmitted during a corresponding transmission occasion may arrive at the communication network 150 prior to a subsequent desired paging occasion. As such, the first tag 132 may be notified of the incoming data during the subsequent desired paging occasion.

For example, the exchange platform 110 may determine a third time t3 for the first transmission occasion 352 such that queued data transmitted during the first transmission occasion 352 may arrive at the communication network 150 prior to the first paging occasion 310 at t1. The communication network 150 may subsequently broadcast one or more paging messages during the first paging occasion 310 alerting the first tag 132 to the incoming data. Similarly, the exchange platform 110 may determine a fourth time t4 for the second transmission occasion 354. Queued data transmitted by the exchange platform 110 at t4 may arrive at the communication network 150 prior to the second paging occasion 312 at t2. As such, the first tag 132 may be notified of the incoming data in one or more paging messages broadcast by the communication network 150 during the second paging occasion 312.

In various embodiments, the exchange platform 110 may be configured to determine a transmission time for each transmission occasion based on a delay 360. In various embodiments, the delay 360 may include, for example, but not limited to, any delays (e.g., transit) between the exchange platform 110 and the communication network 150, and delays (e.g., processing) within the communication network 150 (e.g., the evolved packet core (EPC)). According to one exemplary embodiment, a time difference between a transmission time of a transmission occasion and a time of a subsequent desired paging occasion may be equivalent to or greater than the delay 360. For example, the exchange platform 110 may determine that the delay 360 is an x number of microseconds (µs). As such, a time difference between the first transmission occasion 352 at t3 and the first paging occasion 310 at t1 may be at least x µs. Similarly, a time difference between the second transmission occasion 354 at t4 occurs and the second paging occasion 312 at t2 may also be at least x µs.

Figure 4A:
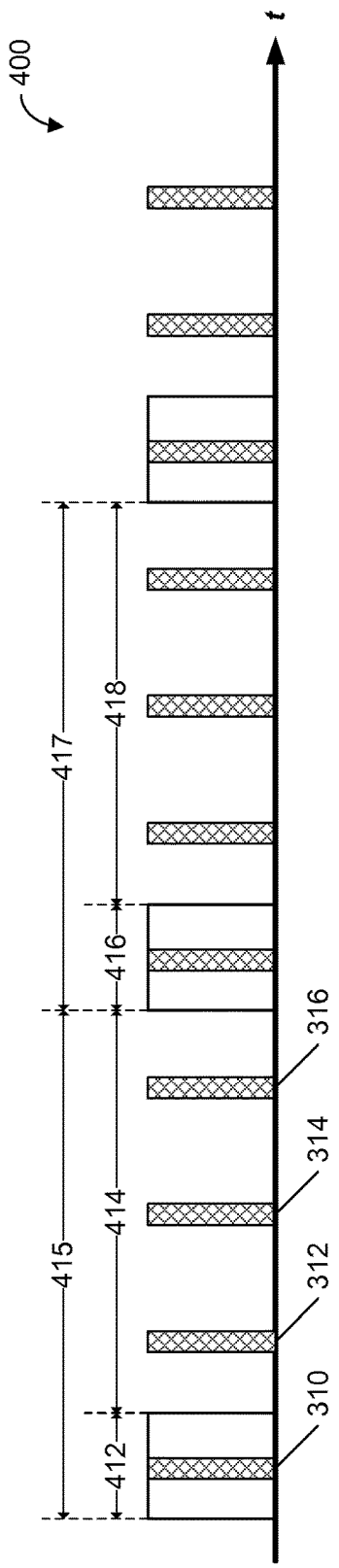
FIG. 4A illustrates a reception schedule according to various embodiments.

FIG. 4A illustrates a reception schedule 400 according to various embodiments. Referring to FIGS. 3A-4A, the second tag 134 may be configured to monitor for paging messages based on the reception schedule 400.

In various embodiments, the reception schedule 400 may include a first active period 412 and a second active period 416 during which the second tag 134 may be in an active mode and monitoring for paging messages from the communication network 150. The reception schedule 400 may further include a first sleep period 414 and a second sleep period 418 during which the second tag 134 may be in a sleep mode and not monitoring for paging messages from the communication network 150.

In various embodiments, the reception schedule 400 of the second tag 134 may include a plurality of periodical cycles, including, for example, but not limited to, a first periodical cycle 415 and a second periodical cycle 417. Each periodical cycle may include an active period and a sleep period. For example, the first periodical cycle 415 may include the first active period 412 and the first sleep period 414. The second periodical cycle 417 may include the second active period 416 and the second sleep period 418.

In various embodiments, each of the plurality of active periods in the reception schedule 400 of the second tag 134 may include a different number of paging occasions than each of the plurality of active periods in the reception schedule 300 of the first tag 132. For example, the first active period 412 in the reception schedule 400 may include the first paging occasion 310. Additionally, in various embodiments, each of the plurality of sleep periods in the reception schedule 400 of the second tag 134 may include a different number of paging occasions than each of the plurality of sleep periods in the reception schedule 300 of the first tag 132. For example, the first sleep period 414 in the reception schedule 400 may include the second paging occasion 312, the third paging occasion 314, and the fourth paging occasion 316.

In various embodiments, a responsiveness of the second tag 134 may be determined based on a number of paging occasions in each of the plurality of active periods of the reception schedule 400 and a number of paging occasions in each of the plurality of sleep periods in the reception schedule 400. Thus, the first tag 132 may be configured to be more (or less) responsive than the second tag 134. For example, each active period in the reception schedule 330 of the first tag 132 may include more (or fewer) paging occasions than each active period in the reception schedule 400 of the second tag 134. Alternately or in addition, each sleep period in the reception schedule 330 of the first tag 132 may include fewer (or more) paging occasions than each sleep period in the reception schedule 400 of the second tag 134.

Moreover, a responsiveness of the second tag 134 may be adjusted by varying one or both of the number of paging occasions in each of the plurality of active periods of the reception schedule 400 and the number of paging occasions in each of the plurality of sleep periods in the reception schedule 400.

Figure 4B:
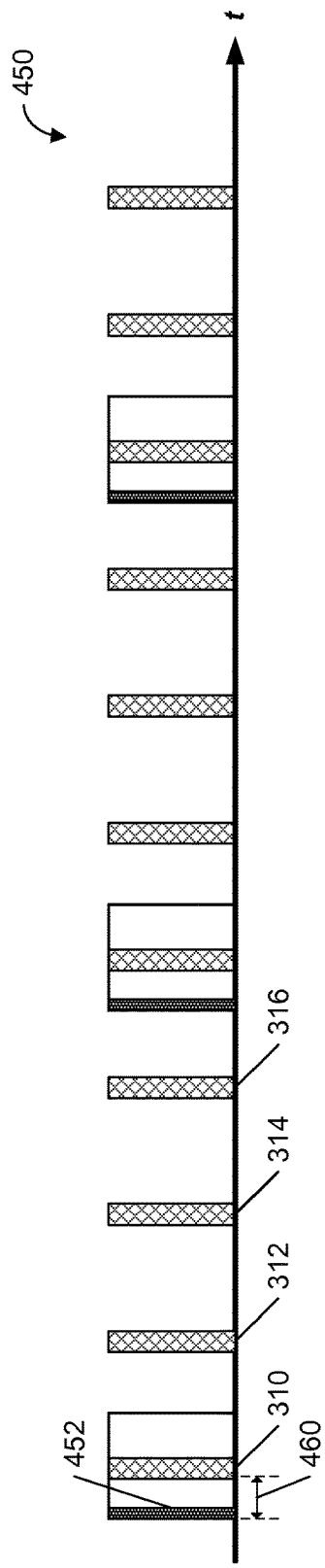
FIG. 4B illustrates a transmission schedule according to various embodiments.

FIG. 4B illustrates a transmission schedule 450 according to various embodiments. In various embodiments, the exchange platform 110 may be configured to queue data received from the second device 124 and destined for the second tag 134. Referring to FIGS. 4A-4B, the exchange platform 110 may be configured to transmit queued data destined for the second tag 134 to the communication network 150 based on the transmission schedule 450. The communication network 150 may subsequently broadcast one or more paging messages (e.g., on a paging channel) alerting the second tag 134 to incoming data and transmit the queued data to the second tag 134.

In various embodiments, the transmission schedule 450 may include a plurality of transmission occasions including, for example, but not limited to, the transmission occasion 452. The transmission occasions in the transmission schedule 450 (e.g., the transmission occasion 452) may correspond to active periods (e.g., the first active period 412) in the reception schedule 400 of the second tag 134. According to one exemplary embodiment, the exchange platform 110 may be configured to determine a transmission time for the transmission occasion 452 such that queued data transmitted to the communication network 150 during the transmission occasion 452 may arrive at the communication network 150 prior to a subsequent desired paging occasion (e.g., the first paging occasion 310). For example, in various embodiments, the exchange platform 110 may determine the transmission time for the transmission occasion 452 based on a delay 460 which includes, for example, but not limited to, transit delay to and processing delay within the communication network 150.

Figure 5:
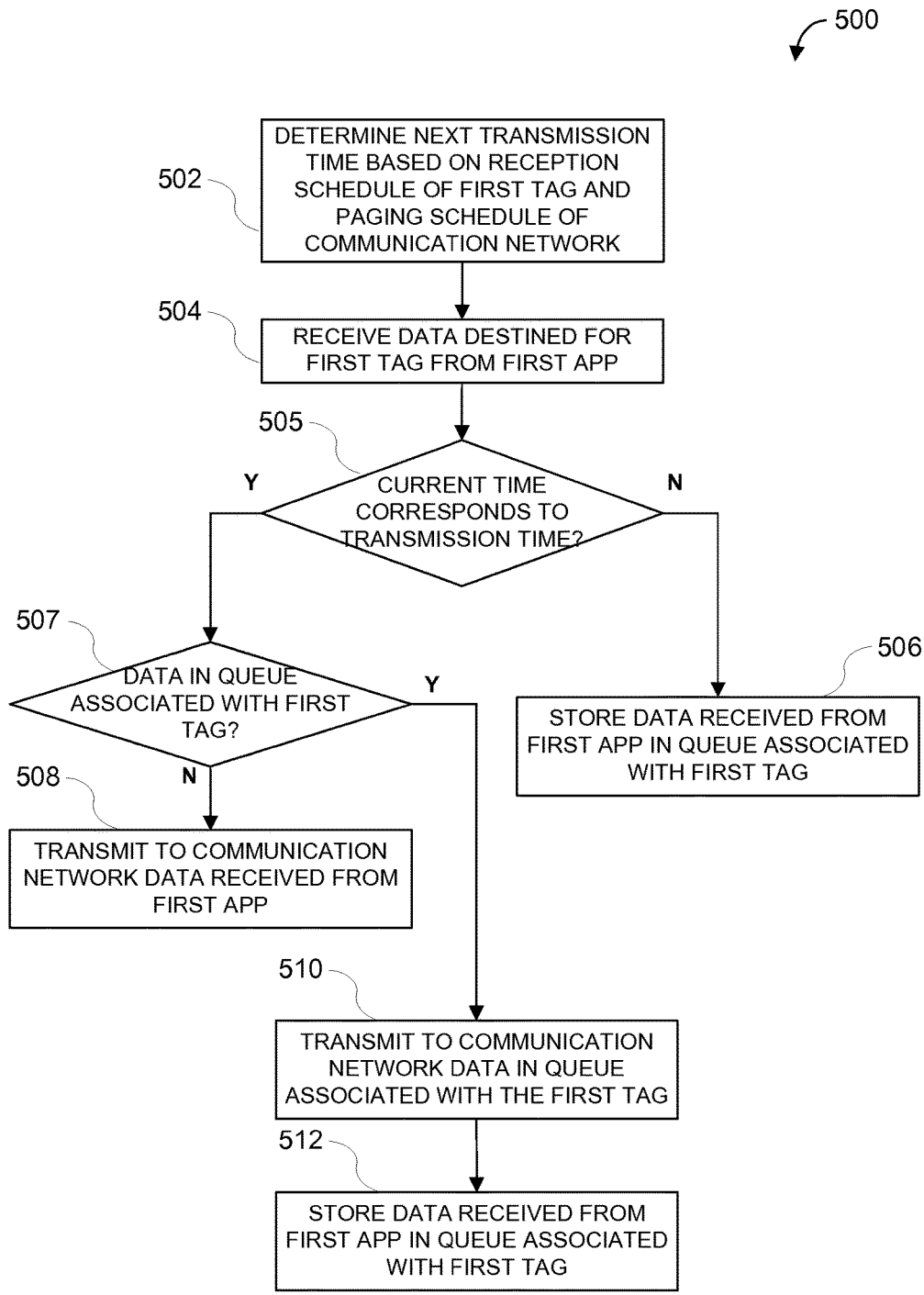
FIG. 5 is a flowchart illustrating a process for extending sleep mode according to various embodiments.

FIG. 5 illustrates a process 500 for extending sleep mode according to various embodiments. Referring to FIGS. 1-5, the process 500 may be performed by the exchange platform 110, for example, by the data synchronization and delivery module 230.

The exchange platform 110 may determine a next transmission time based on the reception schedule 330 of the first tag 132 and the paging schedule 300 of the communication network 150 (502). For example, the exchange platform 110 may determine t3 of the first transmission occasion 352 based on the reception schedule 330 of the first tag 132 and the paging schedule 300 of the communication network 150.

According to one exemplary embodiment, the exchange platform 110 may determine the next transmission time further based on the delay 360. In various embodiments, the delay 360 may include, for example, but not limited to, any delays (e.g., transit) between the exchange platform 110 and the communication network 150, and delays (e.g., processing) within the communication network 150 (e.g., the evolved packet core (EPC)). In various embodiments, the exchange platform 110 may determine the next transmission time (e.g., t3) such that queued data transmitted to the communication network 150 at the next transmission time (e.g., t3) may arrive at the communication network 150 prior to a subsequent desired paging occasion (e.g., the first paging occasion 310 at t2).

The exchange platform 110 may receive data destined for the first tag 132 from a first application (504). For example, the exchange platform 110 may receive from an application (e.g., a pet tracking application) installed on the first device 122, one or more commands controlling or managing the first asset 142 (e.g., a pet) via the first tag 132 (e.g., a wireless pet collar).

The exchange platform 110 may determine whether a current time corresponds to the next transmission time (505). If the exchange platform 110 determines that the current time does not correspond to the next transmission time (505-N), the exchange platform 110 may store the data received from the first application in a queue associated with the first tag 132 (506).

For example, the exchange platform 110 may determine that the next transmission time is at t3. If the exchange platform 110 determines that the current time is not the same than t3, then the exchange platform 110 may store data received from the application installed on the first device 122 in a queue associated with the first tag 132.

Alternately, if the exchange platform 110 determines that the current time corresponds to the next transmission time (505-Y), the exchange platform 110 may determine whether there is data in the queue associated with the first tag 132 (507).

If the exchange platform 110 determines that there is data in the queue associated with the first tag 132 (507-Y), the exchange platform 110 may transmit to the communication network 150 at least a portion of the data in the queue associated with the first tag 132 (510). For example, the exchange platform 110 may select a portion of the queued data on a first-in-first-out (FIFO) basis. The exchange platform 110 may store the data received from the first application in the queue associated with the first tag 132 (512). For example, the exchange platform 110 may store the data received from the application installed on the first device 122 in the queue associated with the first tag 132. In one exemplary embodiment, the exchange platform 110 may transmit data remaining in the queue associated with the first tag 132 at subsequent transmission times (e.g., t4).

Alternately, if the exchange platform 110 determines that there is no data in the queue associated with the first tag 132 (507), the exchange platform 110 may transmit to the communication network 150 the data received form the first application (508). For example, if the exchange platform 110 determines that the queue associated with the first tag 132 is empty, the exchange platform 110 may transmit to the communication network 150 the data received from the application installed on the first device 122.

Although the process 500 is described with respect to the first device 122, the first tag 132, and the first asset 142, a person having ordinary skill in the art can appreciate that the process 500 may be performed with respect to a different device (e.g., the second device 124), a different tag (e.g., the second tag 134), and a different asset (e.g., the second asset 144) without departing from the scope of the present inventive concept.

Figure 6:
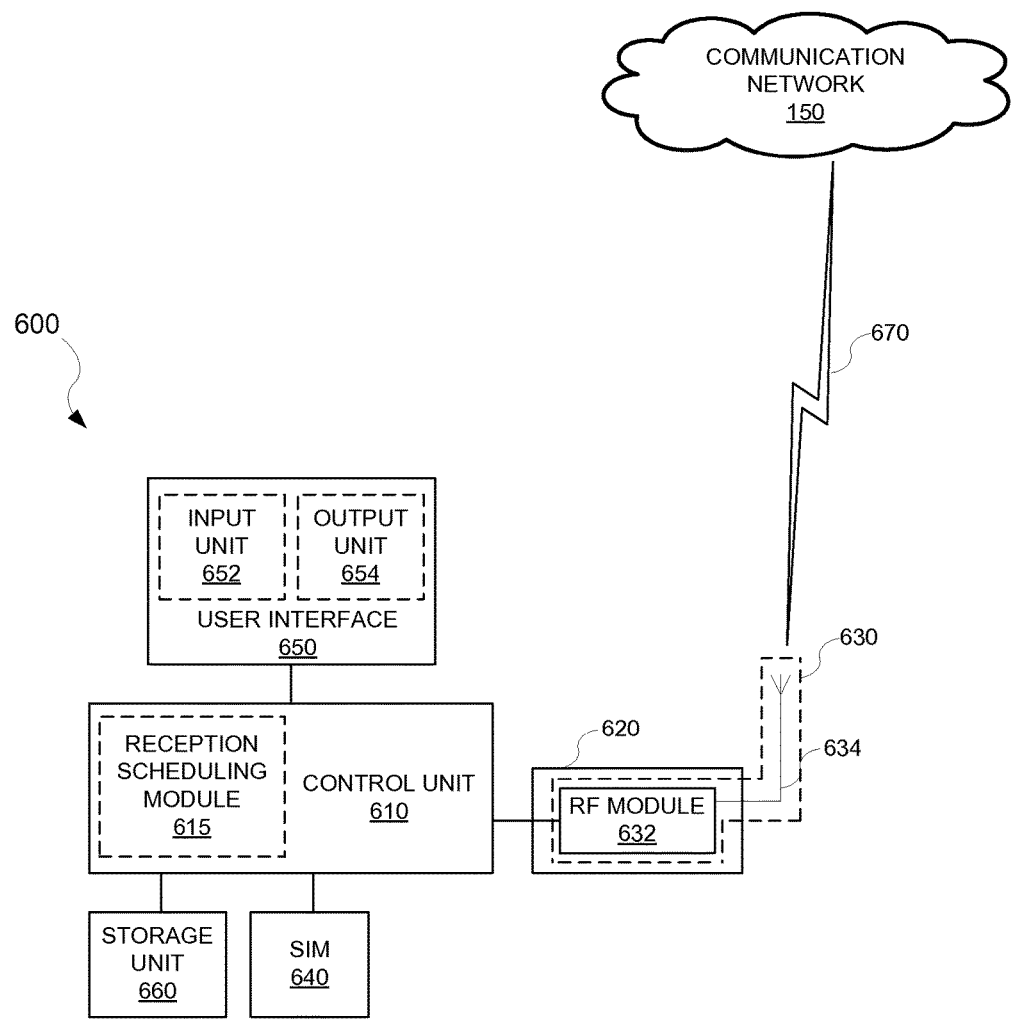
FIG. 6 is a block diagram illustrating a tag according to various embodiments.

FIG. 6 illustrates a tag 600 according to various embodiments. Referring to FIGS. 1 and 6, the tag 600 may implement the first tag 132 and/or the second tag 134. In various embodiments, the tag 600 may include a control unit 610, a communication unit 620, a subscriber identity module (SIM) 640, a user interface 650, and a storage unit 660.

A SIM (for example the 640) in various embodiments may be a Universal Integrated Circuit Card (UICC) that is configured with SIM and/or universal SIM (USIM) applications, enabling access to GSM and/or Universal Mobile Telecommunication (UMTS) networks. The UICC may also provide storage for a phone book and other applications. Alternatively, in a code division multiple access (CDMA) network, a SIM may be a UICC removable user identity module (R-UIM) or a CDMA subscriber identity module (CSIM) on a card. A SIM card may have a central processing unit (CPU), read-only memory (ROM), random access memory (RAM), electrically erasable programmable read-only memory (EEPROM), and input/output (I/O) circuits. An Integrated Circuit Card Identity (ICCID) SIM serial number may be printed on the SIM card for identification. However, a SIM may be implemented within a portion of memory of the tag 600, and thus need not be a separate or removable circuit, chip, or card.

A SIM used in various embodiments may store user account information, an IMSI, a set of SIM application toolkit (SAT) commands, and other network provisioning information, as well as provide storage space for phone book database of the user's contacts. As part of the network provisioning information, a SIM may store home identifiers (e.g., a System Identification Number (SID)/Network Identification Number (NID) pair, a home public land mobile network (HPLMN) code, etc.) to indicate the SIM card network operator provider.

In various embodiments, the communication unit 620 may include an RF chain 630. The RF chain 630 may include, for example, but not limited to, an RF module 632 and an antenna 634. Although the tag 600 is shown to include a single communication unit (e.g., the communication unit 620), a person having ordinary skill in the art can appreciate that the tag 600 may include additional communication units without departing from the scope of the present inventive concept.

In various embodiments, the SIM 640 may associate the communication unit 620 with a subscription 670 on the communication network 150. In various embodiments, the communication network 150 may support one or more RATs, including, for example, but not limited to WCDMA, GSM, LTE, and TD-SCDMA. Although the tag 600 is shown in include a single SIM (e.g., the SIM 640), a person having ordinary skill in the art can appreciate that the tag 600 may include additional SIMs without departing from the scope of the present inventive concept.

In various embodiments, the user interface 650 may include an input unit 652. In some embodiments, the input unit 652 may be, for example, but not limited to, a keyboard or a touch panel. In various embodiments, the user interface 650 may include an output unit 654. In some embodiments, the output unit 654 may be, for example, but not limited to, a liquid crystal display (LCD) or a light emitting diode (LED) display. A person having ordinary skill in the art will appreciate that the user interface 650 may be optional, and that other types or forms of input and output units may be used without departing from the scope of the present inventive concept.

In various embodiments, the control unit 610 may be configured to control the overall operation of the tag 600 including controlling the functions of the communication unit 620. In various embodiments, the control unit 610 may include a reception scheduling module 615 configured to transition the tag 600 between active and sleep modes based on a reception schedule. In various embodiments, the control unit 610 may be, for example, but not limited to, a microprocessor (e.g., general-purpose processor, baseband modem processor, etc.) or a microcontroller.

In various embodiments, the storage unit 660 may be configured to store application programs, application data, and user data. In various embodiments, at least some of the application programs stored at the storage unit 660 may be executed by the control unit 610 for the operation of the tag 600.

Figure 7:
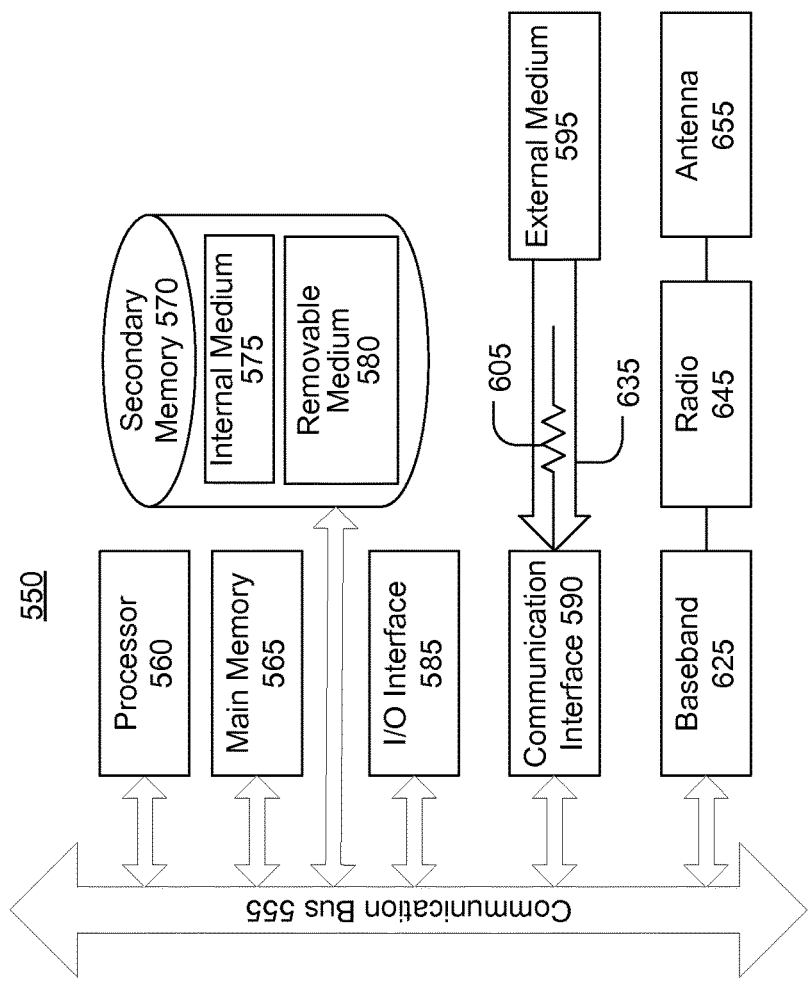
FIG. 7 is a block diagram illustrating a wired or wireless system according to various embodiments.

FIG. 7 is a block diagram illustrating wired or wireless system 550 according to various embodiments. Referring to FIGS. 1 and 7, the system 550 may implement the exchange platform 110, the first device 122, and the second device 124. In various embodiments, the system 550 may be a conventional personal computer, computer server, personal digital assistant, smart phone, tablet computer, or any other processor enabled device that is capable of wired or wireless data communication. A person having ordinary skill in the art can appreciate that other computer systems and/or architectures may be used without departing from the scope of the present inventive concept.

The system 550 preferably includes one or more processors, such as processor 560. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 560.

The processor 560 is preferably connected to a communication bus 555. The communication bus 555 may include a data channel for facilitating information transfer between storage and other peripheral components of the system 550. The communication bus 555 further may provide a set of signals used for communication with the processor 560, including a data bus, address bus, and control bus (not shown). The communication bus 555 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

System 550 preferably includes a main memory 565 and may also include a secondary memory 570. The main memory 565 provides storage of instructions and data for programs executing on the processor 560. The main memory 565 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 570 may optionally include a internal memory 575 and/or a removable medium 580, for example a floppy disk drive, a magnetic tape drive, a compact disc ("CD") drive, a digital versatile disc ("DVD") drive, etc. The removable medium 580 is read from and/or written to in a well-known manner. Removable medium 580 may be, for example, a floppy disk, magnetic tape, CD, DVD, SD card, etc.

The removable medium 580 is a non-transitory computer readable medium having stored thereon computer executable code (i.e., software) and/or data. The computer software or data stored on the removable medium 580 is read into the system 550 for execution by the processor 560.

In alternative embodiments, secondary memory 570 may include other similar means for allowing computer programs or other data or instructions to be loaded into the system 550. Such means may include, for example, an external medium 595 and a communication interface 590. Examples of external medium 595 may include an external hard disk drive or an external optical drive, or and external magneto-optical drive.

Other examples of secondary memory 570 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are a removable medium 580 and a communication interface 590, which allow software and data to be transferred from an external medium 595 to the system 550.

System 550 may also include an input/output ("I/O") interface 585. The I/O interface 585 facilitates input from and output to external devices. For example the I/O interface 585 may receive input from a keyboard or mouse and may provide output to a display. The I/O interface 585 is capable of facilitating input from and output to various alternative types of human interface and machine interface devices alike.

System 550 may also include a communication interface 590. The communication interface 590 allows software and data to be transferred between system 550 and external devices (e.g. printers), networks, or information sources. For example, computer software or executable code may be transferred to system 550 from a network server via communication interface 590. Examples of communication interface 590 include a modem, a network interface card ("NIC"), a wireless data card, a communications port, a PCMCIA slot and card, an infrared interface, and an IEEE 1394 fire-wire, just to name a few.

Communication interface 590 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 590 are generally in the form of electrical communication signals 605. These electrical communication signals 605 are preferably provided to communication interface 590 via a communication channel 635. In one embodiment, the communication channel 635 may be a wired or wireless network, or any variety of other communication links. Communication channel 635 carries the electrical communication signals 605 and can be implemented using a variety of wired or wireless communication means including wire or cable, fiber optics, conventional phone line, cellular phone link, wireless data communication link, radio frequency ("RF") link, or infrared link, just to name a few.

Computer executable code (i.e., computer programs or software) is stored in the main memory 565 and/or the secondary memory 570. Computer programs can also be received via communication interface 590 and stored in the main memory 565 and/or the secondary memory 570. Such computer programs, when executed, enable the system 550 to perform the various functions of the present invention as previously described.

In this description, the term "computer readable medium" is used to refer to any non-transitory computer readable storage media used to provide computer executable code (e.g., software and computer programs) to the system 550. Examples of these media include main memory 565, secondary memory 570 (including internal memory 575, removable medium 580, and external medium 595), and any peripheral device communicatively coupled with communication interface 590 (including a network information server or other network device). These non-transitory computer readable mediums are means for providing executable code, programming instructions, and software to the system 550.

In an embodiment that is implemented using software, the software may be stored on a computer readable medium and loaded into the system 550 by way of removable medium 580, I/O interface 585, or communication interface 590. In such an embodiment, the software is loaded into the system 550 in the form of electrical communication signals 605. The software, when executed by the processor 560, preferably causes the processor 560 to perform the inventive features and functions previously described herein.

The system 550 also includes optional wireless communication components that facilitate wireless communication over a voice and over a data network. The wireless communication components comprise an antenna system 655, a radio system 645 and a baseband system 625. In the system 550, radio frequency ("RF") signals are transmitted and received over the air by the antenna system 655 under the management of the radio system 645.

In one embodiment, the antenna system 655 may comprise one or more antennae and one or more multiplexors (not shown) that perform a switching function to provide the antenna system 655 with transmit and receive signal paths. In the receive path, received RF signals can be coupled from a multiplexor to a low noise amplifier (not shown) that amplifies the received RF signal and sends the amplified signal to the radio system 645.

In alternative embodiments, the radio system 645 may comprise one or more radios that are configured to communicate over various frequencies. In one embodiment, the radio system 645 may combine a demodulator (not shown) and modulator (not shown) in one integrated circuit ("IC"). The demodulator and modulator can also be separate components. In the incoming path, the demodulator strips away the RF carrier signal leaving a baseband receive audio signal, which is sent from the radio system 645 to the baseband system 625.

If the received signal contains audio information, then baseband system 625 decodes the signal and converts it to an analog signal. Then the signal is amplified and sent to a speaker. The baseband system 625 also receives analog audio signals from a microphone. These analog audio signals are converted to digital signals and encoded by the baseband system 625. The baseband system 625 also codes the digital signals for transmission and generates a baseband transmit audio signal that is routed to the modulator portion of the radio system 645. The modulator mixes the baseband transmit audio signal with an RF carrier signal generating an RF transmit signal that is routed to the antenna system and may pass through a power amplifier (not shown). The power amplifier amplifies the RF transmit signal and routes it to the antenna system 655 where the signal is switched to the antenna port for transmission.

The baseband system 625 is also communicatively coupled with the processor 560. The processor 560 has access to main memory 565 and/or secondary memory 570. The processor 560 is preferably configured to execute instructions (i.e., computer programs or software) that can be stored in the main memory 565 or the secondary memory 570. Computer programs can also be received from the baseband processor 620 and stored in the main memory 565 or in secondary memory 570, or executed upon receipt. Such computer programs, when executed, enable the system 550 to perform the various functions of the present invention as previously described. For example, the main memory 565 may include various software modules (not shown) that are executable by processor 560.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

The invention claimed is:

1. A method comprising, by at least one hardware processor of an exchange platform that is communicatively connected to a wireless communication network:
   for each of a plurality of radio frequency (RF) tags, storing a transmission schedule that corresponds to a reception schedule followed by the RF tag, wherein each RF tag is configured to, for each of a plurality of cycles, transition between a sleep period, in which the RF tag does not monitor a paging channel of the wireless communication network, and an active period, in which the RF tag monitors the paging channel of the wireless communication network, according to its reception schedule;
   determining a next transmission time to transmit data to a first one of the plurality of RF tags, based on the transmission schedule for the first RF tag; and,
   when data destined for the first RF tag is received, queuing the data until the next transmission time, and, at the next transmission time, transmitting the data to the first RF tag via the wireless communication network.

2. The method of claim 1, further comprising configuring the reception schedule for the first RF tag, such that the active period for each of the plurality of cycles includes one or more paging occasions within a paging cycle of the wireless communication network, and the sleep period for each of the plurality of cycles includes one or more paging occasions within the paging cycle of the wireless communication network.

3. The method of claim 2, wherein the next transmission time is determined such that the next transmission time precedes a paging occasion, included in the active period of the reception schedule of the first RF tag, by at least a delay amount that is based on at least one of a transit delay between the exchange platform and the wireless communication network and a processing delay within the wireless communication network.

4. The method of claim 2, wherein the reception schedule of the first RF tag defines an active period that includes a different number of paging occasions than an active period defined by the reception schedule for a second one of the plurality of RF tags.

5. The method of claim 1, further comprising varying the reception schedule of the first RF tag by adjusting one or both of a number of the paging occasions included in the active period and a number of the paging occasions included in the sleep period of each of the plurality of cycles.

6. A system comprising:
   a non-transitory computer readable medium configured to, for each of a plurality of radio frequency (RF) tags, store a transmission schedule that corresponds to a reception schedule followed by the RF tag, wherein each RF tag is configured to, for each of a plurality of cycles, transition between a sleep period, in which the RF tag does not monitor a paging channel of a wireless communication network, and an active period, in which the RF tag monitors the paging channel of the wireless communication network, according to its reception schedule;
   a processor, communicatively coupled with the non-transitory computer readable medium, that executes programmed modules to
      determine a next transmission time to transmit data to a first one of the plurality of RF tags, based on the transmission schedule for the first RF tag; and,
      when data destined for the first RF tag is received, queue the data until the next transmission time, and, at the next transmission time, transmit the data to the first RF tag via the wireless communication network.

7. The system of claim 6, wherein the processor executes the programmed modules to further configure the reception schedule followed by the first RF tag, such that the active period for each of the plurality of cycles includes one or more paging occasions within a paging cycle of the wireless communication network, and the sleep period for each of the plurality of cycles includes one or more paging occasions within the paging cycle of the wireless communication network.

8. The system of claim 7, wherein the next transmission time is determined such that the next transmission time precedes a paging occasion, included in the active period of the reception schedule of the first RF tag, by at least a delay amount that is based on at least one of a transit delay between the exchange platform and the wireless communication network and a processing delay within the wireless communication network.

9. The system of claim 7, wherein the reception schedule of the first RF tag defines an active period that includes a different number of paging occasions than an active period defined by the reception schedule for a second one of the plurality of RF tags.

10. The system of claim 6, wherein the processor executes the programmed modules to further vary the reception schedule of the first RF tag by adjusting one or both of a number of the paging occasions included in the active period and a number of the paging occasions included in the sleep period of each of the plurality of cycles.

* * * * *